United States Patent
Henne

(10) Patent No.: US 11,997,949 B2
(45) Date of Patent: Jun. 4, 2024

(54) FORAGE HARVESTER MATERIAL APPLICATOR SYSTEM AND RELATED METHOD

(71) Applicant: Great Lakes Forage Systems, LLC, Grant, MI (US)

(72) Inventor: Michael P. Henne, Grand Rapids, MI (US)

(73) Assignee: Great Lakes Forage Systems, LLC, Grant, MI (US)

( * ) Notice: Subject to any disclaimer, the term of this patent is extended or adjusted under 35 U.S.C. 154(b) by 769 days.

(21) Appl. No.: 17/175,977

(22) Filed: Feb. 15, 2021

(65) Prior Publication Data

US 2022/0053698 A1 Feb. 24, 2022

Related U.S. Application Data

(63) Continuation-in-part of application No. 16/996,677, filed on Aug. 18, 2020, now Pat. No. 11,641,802.

(51) Int. Cl.
*A01D 43/14* (2006.01)
*A01D 43/077* (2006.01)
(Continued)

(52) U.S. Cl.
CPC .......... *A01D 43/14* (2013.01); *A01D 43/077* (2013.01); *A01D 61/008* (2013.01); *A01D 67/04* (2013.01)

(58) Field of Classification Search
CPC .... A01D 43/077; A01D 43/14; A01D 61/008; A01F 15/0816
See application file for complete search history.

(56) References Cited

U.S. PATENT DOCUMENTS 2,757,598 A 8/1956 West
2,787,208 A 4/1957 Russell
(Continued)

FOREIGN PATENT DOCUMENTS

DE 102009002102 A1 10/2010
EP 2620051 7/2013
(Continued)

OTHER PUBLICATIONS

455 Pneumatic Granular Innoculant Applicator Operator's Manual, Valmar Airflo Inc., Publication Date Feb. 1998.

*Primary Examiner* — Gene O Crawford
*Assistant Examiner* — Keith R Campbell
(74) *Attorney, Agent, or Firm* — Warner Norcross + Judd LLP

(57) ABSTRACT

A system and related method of applying forage treatment material to harvested forage is provided. The system can include a mobile forage harvester having a chute, a vacuum source that produces a vacuum, and a bin that stores granular treatment material for dispensation. The chute can be joined with a catch tube having a catch opening. A tube can extend from the bin toward the catch tube, but can be separated from the catch opening by an open gap. The material can be dispensed from the tube into the open gap, and drawn across the open gap and into the catch opening with the vacuum so the material mixes with the harvested forage moving along the pathway in the chute under force of the vacuum. The bin, tubes and the open gap can be located in an interior compartment to protect them from the elements. A related method is provided.

20 Claims, 7 Drawing Sheets

(51) Int. Cl.
    *A01D 61/00*         (2006.01)
    *A01D 67/04*         (2006.01)

(56)            References Cited

U.S. PATENT DOCUMENTS

| | | |
|---|---|---|
| 3,059,566 A | 10/1962 | Grau |
| 3,812,956 A | 5/1974 | Hindermann |
| 5,082,414 A | 1/1992 | Taupin |
| 6,988,352 B2 | 1/2006 | Van Vooren |
| 7,300,003 B1 * | 11/2007 | Kreikemeier .......... A01D 43/14 |
| | | 239/654 |
| 7,874,133 B2 | 1/2011 | Depestel |
| 7,900,557 B2 * | 3/2011 | Freeman ............. A01F 15/0816 |
| | | 56/341 |
| 10,426,090 B2 * | 10/2019 | Henne .................. A01D 43/085 |
| 10,694,657 B2 | 6/2020 | Grieshop |
| 2002/0124541 A1 | 9/2002 | Oepping et al. |
| 2003/0006312 A1 | 1/2003 | Dohrmann et al. |
| 2003/0201333 A1 | 10/2003 | Oepping et al. |
| 2005/0077389 A1 | 4/2005 | Lebeda et al. |
| 2011/0120071 A1 | 5/2011 | Freeman et al. |
| 2011/0167777 A1 | 7/2011 | Dohrmann |
| 2012/0090287 A1 | 4/2012 | O'Daniel |
| 2018/0141758 A1 | 5/2018 | Ross |
| 2019/0223381 A1 | 7/2019 | Henne |

FOREIGN PATENT DOCUMENTS

| | | |
|---|---|---|
| EP | 3338529 | 6/2018 |
| GB | 2527046 | 12/2015 |

* cited by examiner

FORAGE HARVESTER MATERIAL APPLICATOR SYSTEM AND RELATED METHOD

CROSS REFERENCE TO RELATED APPLICATIONS

This application is a continuation in part of U.S. application Ser. No. 16/996,677, filed Aug. 18, 2020, which is incorporated by reference in its entirety.

BACKGROUND OF THE INVENTION

The present invention relates to forage harvesters, and more particularly to a material applicator system and related method to precisely apply treatment material to crops harvested by a forage harvester.

In the farming industry, when crops are harvested, it is frequently helpful to apply additives, for example, chemical or biological treatments such as preservatives to those crops, also referred to as forage herein, to improve, preserve or maintain the feed or other value of the forage. Applying the additive materials in the correct amounts can be a challenge because the rate of harvesting varies with factors such as the particular forage harvester used in the harvest, the speed and operation of the harvester, the crop quality and its density. Adding incorrect amounts of additives can lead to a waste of expensive additives and/or deterioration of the harvested forage when it is stored.

Several manufacturers provide application systems to address the issue of adding the correct amount of such additives. One manufacturer is Great Lakes Forage Systems, LLC of Grand Rapids, Michigan Its system is disclosed in U.S. Pat. No. 10,426,090 to Henne, which is incorporated by reference in its entirety here. A system disclosed in this patent utilizes a long, uninterrupted tube, which is secured to various parts of the harvester, to move a supply of material agglomerated and stacked upon itself within the tube toward a chute. When the material reaches the chute, a vacuum drawn in chute of a forage harvester pulls treatment material agglomerated in and filling the tube's diameter, directly into the chute. While this system works well, the vacuum can pull moisture, humid air and/or rain from the environment into the chute. Some treatment materials can be highly hydroscopic, so this added moisture can cause the material to clump and in some cases clog inside the tube, where the material agglomerates for a time as it moves though and fills the tube. Thus, the material is impaired from being applied in some cases. Further, where bins storing the treatment material encounter wet or rainy environments, they sometimes can leak, allowing liquids to enter the bin and cause the material to clump so that it cannot easily exit the bin.

Accordingly, there remains room for improvement in the field of forage harvesting and related equipment, and in particular, protection of forage treatment materials from the elements and/or ease of addressing clogs in a system.

SUMMARY OF THE INVENTION

A system and related method of applying forage treatment material to harvested forage is provided.

In one embodiment, the system can include a chute, a vacuum source that produces a vacuum, which conveys harvested forage through the chute, and a bin that stores granular treatment material for dispensation.

In another embodiment, the chute can be joined with a catch tube having a catch opening. A dispensing tube can extend from the bin toward the catch tube, but can be separated from the catch opening by an open gap.

In still another embodiment, the granular treatment material can be dispensed from the dispensing tube into the open gap. The granular treatment material can be drawn across the open gap and into the catch opening, through the catch tube and into the chute, under a suction force exerted by the vacuum so that the granular treatment material mixes with the harvested forage moving along the pathway in the chute.

In yet another embodiment, the bin, the dispensing tube, the catch tube, and the open gap all can be located in an interior compartment to shield these components from ambient elements, which can include environmental precipitation, such as rain, snow, sleet, and the like, as well as general moisture, humidity and wet conditions. In cases where the granular treatment material passes from the dispensing tube to the catch tube in the open gap, that material is less prone to becoming damp, moist or wet because it is inside the interior compartment of the forage harvester.

In even another embodiment, the system can be mounted on a motorized forage harvester capable of conveying itself along the ground. The interior compartment can be a service bay located interiorly within the forage harvester. The service bay can include a plurality of panels that at least partially surround or conceal the interior compartment, safeguarding it from ambient elements. The service bay can provide access to a motor, belts, operating systems, vacuum sources, such as blowers or fans, and other components of the forage harvester.

In a further embodiment, the catch tube can be a short tube attached to the chute, optionally in a cantilevered manner. The catch opening of the catch tube can be sized to enable a tool to extend from the open gap into the catch tube to loosen and/or remove granular treatment material from an interior surface of the catch tube while the catch tube remains joined with the chute, without disassembly or movement of the catch tube, the dispensing tube or parts of the bin and its components. In some cases, the catch opening can be 2", 3", 4", 5", 6" or more in dimension or diameter, so that a user can plunge and scrape any accumulated, clumped treatment material from the interior surfaces of the catch tube with a tool, such as a scraper, screwdriver, dowel, stick or the like. Again, due to the open gap adjacent the catch opening, the user need not disassemble the tubes, the catch opening, the chute, or other components to reach and address the clumped or agglomerated treatment material.

In still a further embodiment, the harvester can include a longitudinal axis extending from a front to a rear, a motor, a body driven by the motor, a cutting head forward of the body, and an ejector chute that propels the harvested forage from the motorized forage harvester along a trajectory through the air toward a container distal from the motorized forage harvester.

In yet a further embodiment, the catch opening can be upwardly oriented, and the tube opening can be downwardly oriented. The granular treatment material can fall under the force of gravity out the tube opening. Due to the vacuum in the catch tube exerting a suction force in a suction force zone around the catch opening, in the open gap and optionally inside the interior compartment, the vacuum pulls the falling granular material a trajectory toward the catch opening with the suction force. Optionally, the trajectory can be an arched trajectory that curves toward the catch opening, due to the suction force altering the vertical trajectory due to gravity pulling the material downward.

In even a further embodiment, an access panel can be disposed in the interior compartment adjacent the bin. This access panel can provide access to the chute, or a vacuum source, such as a blower, associated with the chute, or some other component. The bin can be selectively moveable relative to the access panel to enable a user to access the access panel, optionally without disassembling or disconnecting any components of the bin from other items. In this movement, the dispensing tube can simply move away from the catch tube. The tubes optionally need not be disconnected because they can already be separated from one another across the open gap.

In another, further embodiment, the bin can be moveable. The access panel can be obstructed by the bin when the bin is in an application mode. The access panel is not obstructed by the bin when the bin is in an access mode. The bin can move in transitioning from the application mode to the access mode. The bin can be mounted to a frame that includes a hinge and can be mounted to a bar. The frame and bin can rotate about the hinge and/or bar, or can pivot about a pivot axis in some cases, to provide access to the access panel.

In another embodiment, a method of using an agricultural forage treatment applicator system to deliver a granular treatment material to forage during harvesting is provided. The method can comprise: harvesting forage from a field with a mobile forage harvester as the harvester moves in the field; providing a vacuum and conveying harvested forage through a chute and along a pathway with the vacuum, the chute joined with a catch tube having a first end adjacent an interior of the chute, and a second end distal from the first end and defining catch opening; providing a bin mounted in an interior compartment inside the mobile forage harvester; providing a tube extending away from the bin toward the catch tube, the tube including a tube opening separated from the catch opening by an open gap; moving a granular treatment material so that the granular treatment material moves out of the tube into the open gap; and drawing the moving granular material across the open gap and into the catch opening with the vacuum exerting a suction force on the granular treatment material as the granular treatment material moves within the open gap between the catch opening and the tube opening so that the granular treatment material mixes with the harvested forage moving along the pathway in the chute.

In still another embodiment, the granular treatment material can fall under the force of gravity out the tube opening after the moving step. As the granular treatment material is airborne and falling through the air, the granular treatment material also can be pulled via a suction force of the vacuum along a trajectory toward the catch opening. Optionally, this trajectory can be an arched trajectory that curves toward the catch opening.

In yet another embodiment, the granular treatment material falls through the air along a trajectory that is dictated by a suction force that can be exerted directly on the falling granular treatment material by the vacuum. Optionally, the trajectory deviates from a normal vertical trajectory due to the force of gravity acting on the granular treatment material because the suction force can act directly on individual particles of the material and pull them off the vertical trajectory toward the catch opening from which the suction force produced by the vacuum is emanating.

In yet another embodiment, the catch tube can extend directly from the chute in a cantilevered manner. The catch tube can remain relatively open as the material is suctioned through the catch tube, without the material stacking, agglomerating or backing up to occlude the catch tube. The catch tube can be less than 3 or 4 feet long so that the suction force acts on and pulls the material particles through the catch tube from the open gap to the interior of the chute.

The current embodiments of the system and related method of applying forage treatment material to harvested forage provide benefits in crop treatment that previously have been unachievable. For example, forage treatment material can be precisely metered and applied to harvested forage as the forage is harvested. Where the storage bin, dispensing tube and catch tube are disposed in an interior compartment of the harvester, the granular treatment material can stay dry. The interior compartment can shield these components and the material from ambient elements, such as moisture, rain, sleet, snow and excess humidity. Where the vacuum pulls the material into the chute, the ambient elements also are less likely to be pulled in with the material because the suction is being exerted primarily inside the interior compartment, rather than out in an open environment. The material can be less prone to clumping, jamming or clogging the catch tube due to the shielding of the bin and material from ambient elements. Further, where the catch tube with a catch opening is included, and accessible within the interior compartment, a user can insert a tool manually from the open gap into the catch tube to remove granular treatment material from an interior surface of the catch tube while the catch tube remains joined with the chute and while the dispensing tube remains attached to the bin. This can reduce the amount of disassembly and assembly for the user to remove any material inside the catch tube that might impede flow of material into or through the chute. Where the bin is moveable within the interior compartment, the bin can be easily reoriented to gain access to other components inside the interior compartment, and can be easily returned to a precise location to later continue dispensing of the granular treatment material.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
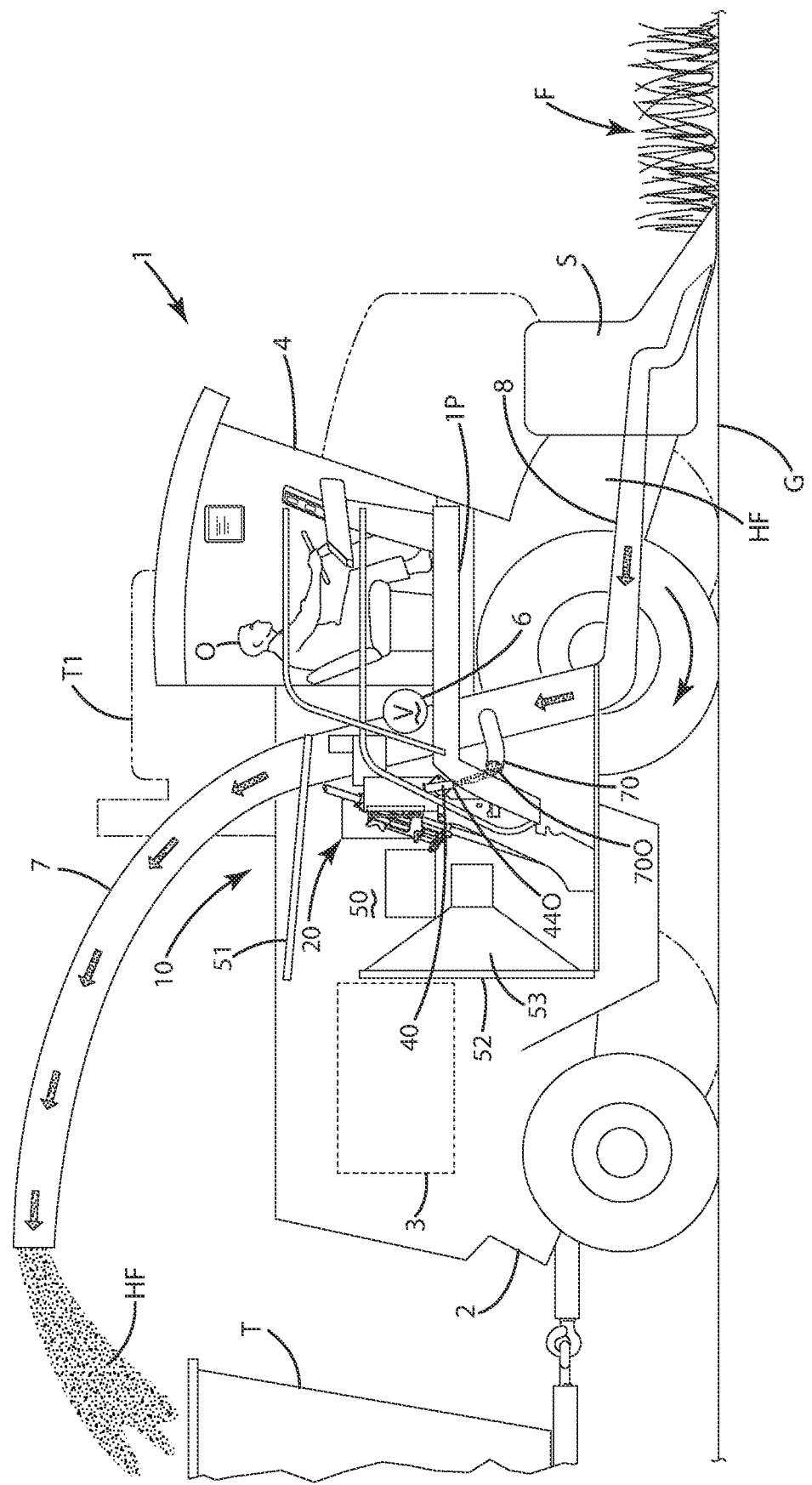
FIG. 1 is a side view of a forage harvester harvesting forage in a field while an agricultural forage treatment applicator system of a current embodiment applies forage treatment material to the forage as the forage harvesting is ongoing.

A current embodiment of the agricultural forage treatment applicator system is illustrated in FIGS. 1-6, and generally designated 10. The applicator system 10 can include or can be mounted to a forage harvester 1, which can be a motorized forage harvester capable of harvesting forage F from a field G as the harvester 1 moves along the ground in the field F under power provided by a motor 3 of the harvester 1. Of course, this system can also be utilized with other types of forage harvesters that may or may not be motorized. The harvester may come in the form of a pull behind trailer that is not motorized, but rather pulled by another motorized implement such as a tractor or truck. The current embodiment of the system 10 will, however, be described in conjunction with a motorized forage harvester capable of propelling itself over ground in a field or across some other surface.

The system 10 also will be described in conjunction with the harvest of forage F. Forage F can be any type of crop, for example, grains such as corn, wheat, oats, barley, and any other type of crop, such as alfalfa, timothy, grasses, legumes, brassicas and the like. Further, the system 10 will be described in conjunction with the dispensation and application of a generally dry, granular treatment material 100. This granular treatment material optionally can comprise a particulate matter that is coated with, admixed with or otherwise joined or associated with a chemical and/or biological material, for example, a preservative and/or one or more bacteria strains. As another example, the particulate matter can be in the form of sand or a silica-based or inert, nontoxic carrier type dry material having low or no moisture content. The material can be coated with and/or mixed with a preservative such as potassium sorbate. The treatment material, for example the particulate matter, also can be admixed with a powder or have coated thereon or otherwise associated there with one or more bacteria strains in a dormant, non-multiplying form. Optionally, one, two, three or more types of bacteria strains can be included in the treatment material. These bacteria strains can be fermenting bacteria, such as lactic acid producing bacteria and/or other silage fermentation organisms. The treatment material optionally can include enzymes, such as cellulases, amylases, hemi-cellulases, pectinases and xylanases, or other ingredients that facilitate the breakdown of organic compounds of the forage into substances that animals and microbes can use as a source of nutrients. Further optionally, the treatment material can include glucose or molasses as a source of sugar to stimulate bacterial action to get the bacteria to start fermentation immediately. It will be appreciated that although the granular treatment material described herein can be a type of preservative, other types of biological, chemical or other types of treatment materials can be applied to the forage with the applicator system herein.

Figure 2:
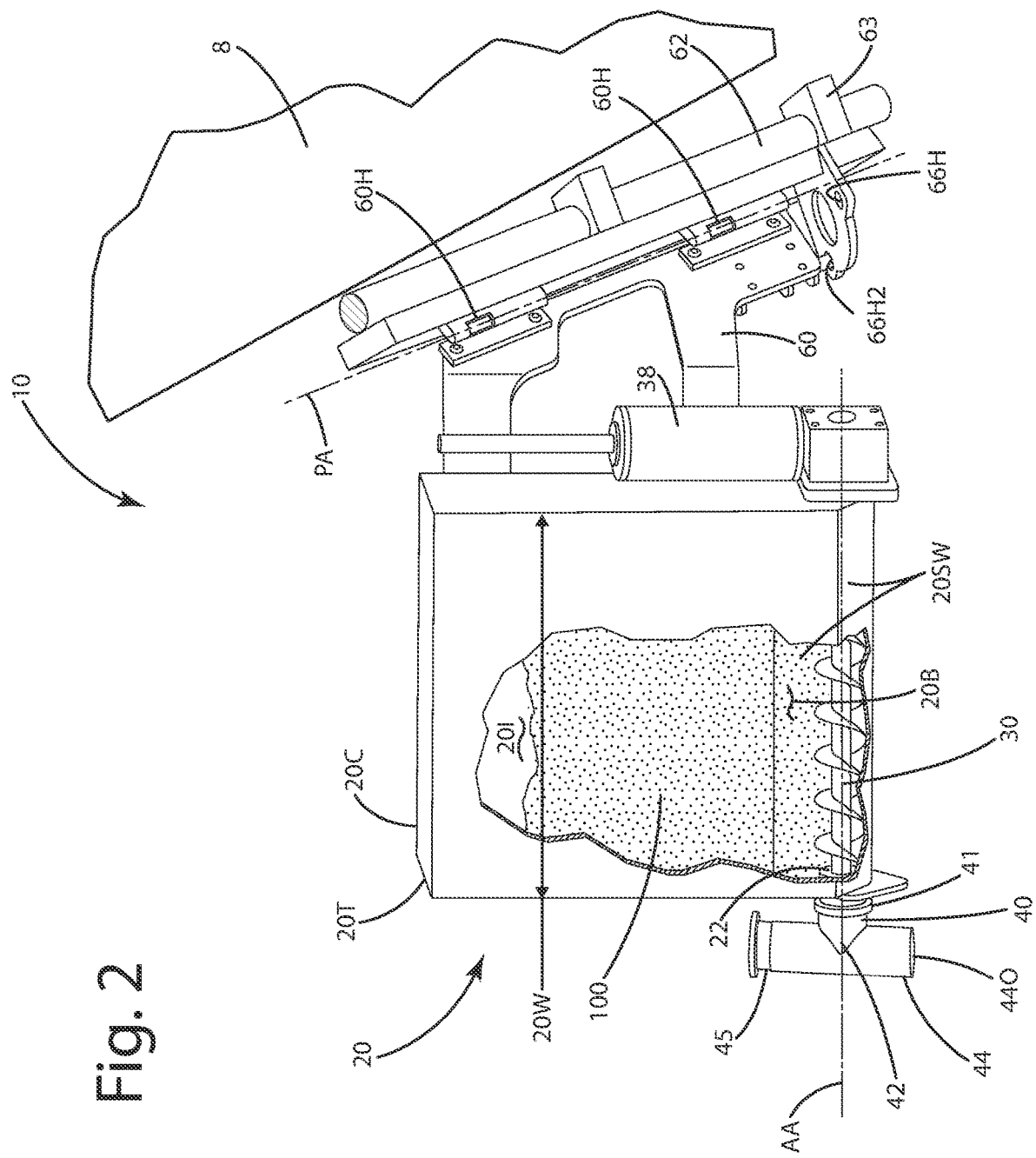
FIG. 2 is a perspective view of a bin, dispensing tube, and motor of the forage applicator treatment system, with the foregoing mounted to a moveable frame so that the bin is in an access mode so a user can access another component of the harvester.
Figure 3:
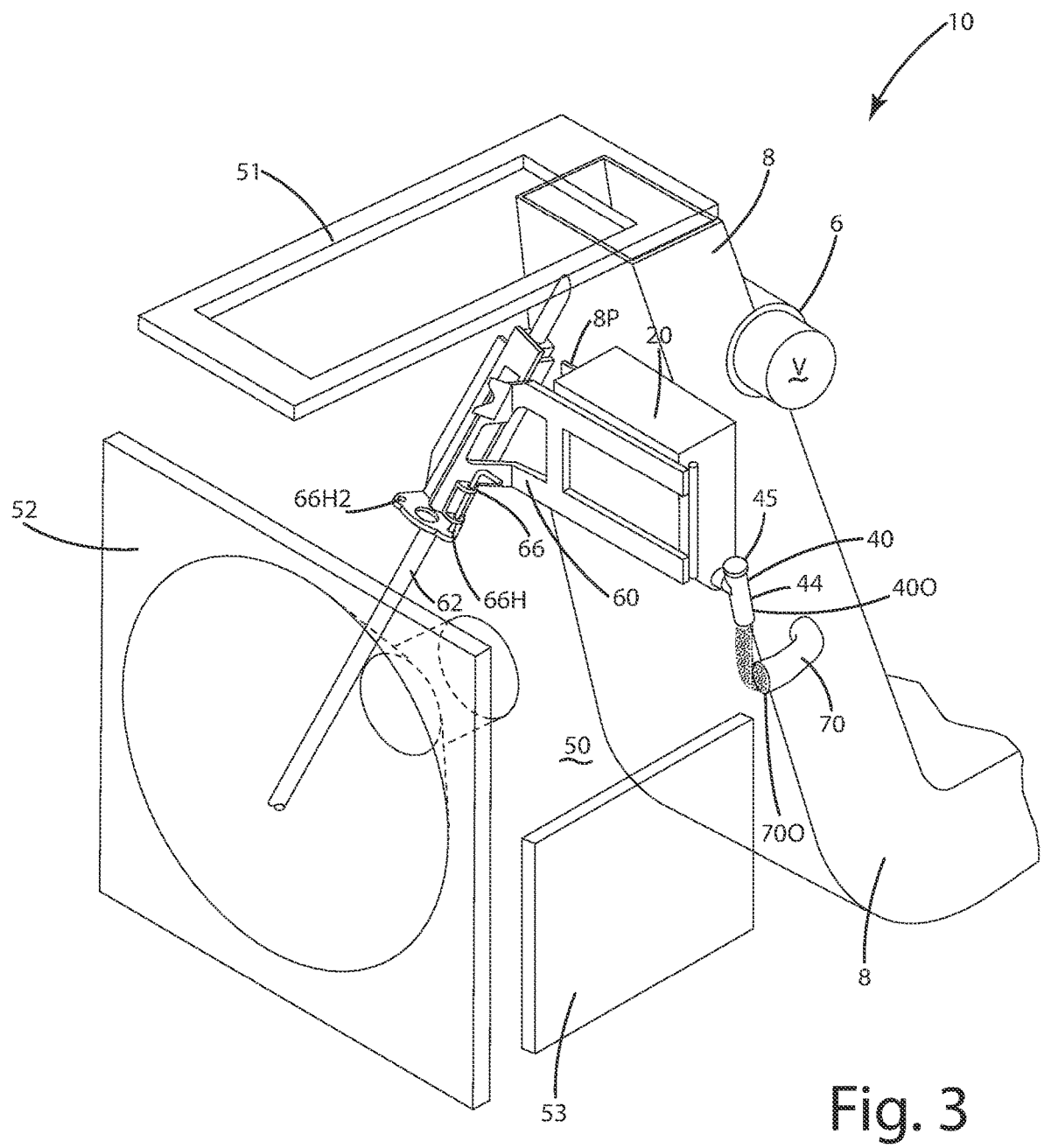
FIG. 3 is a break away view of the applicator system with the bin located inside and interior compartment, such as a service bay, of the harvester, and the bin in an application mode, obstructing an access panel inside the service bay.

With reference to FIGS. 1-3, the system 10 can be mounted on and/or include the motorized forage harvester 1 having an motor 3 mounted in a body 2 of the harvester to run a fan 6, as well as move the harvester 1 along the ground in a field G in which the forage F grows. The motor or engine can be an interior combustion engine, an electric motor or other power source capable of providing output to operate the harvester and its components, optionally to move the harvester across a field and/or perform harvesting operations. The harvester 1 can include a longitudinal axis LA extending from front to back of the harvester, generally bisecting or dividing the harvester into left and right sides. The engine 3 also can run a powerful fan 6, also referred to as an accelerator or a blower, which is in fluid communication with a chute 8. Examples of such fans are described in U.S. Pat. No. 7,874,133 to Depestel and U.S. Pat. No. 6,988,352 to Van Vooren, which are hereby incorporated by reference in their entirety. The fan, blower or some other similar vacuum producing component, can draw a vacuum V within itself and/or in the chute 8 that conveys chopped forage HF from the chopper head 5 optionally to the ejector chute 7, sometimes referred to as the discharge spout, which propels the chopped forage HF along a trajectory shown in FIG. 1 to another container, which can be a trailer T pulled by another machine T1, which can be a truck, tractor or other motorized vehicle. It is noted here that the harvested forage can be cut at the time the forage harvester passes over the field, or later, after the forage harvester or another machine has already cut the forage and left the forage laying in the field, in rows or other states, depending on the application. In either case, the forage harvester can be considered to harvest forage or to be harvesting forage when the forage enters the harvester.

With reference to FIGS. 1-6, the system 10 can include a container, box or bin 20 that is mounted inside an interior compartment 50 of the harvester 1. This interior compartment 50 can be in the form of an interior service bay. This interior compartment can be disposed between the forward and aft wheels or tracks of the forage harvester 1. In some cases, the interior compartment can be located directly between opposing left and right wheels or tracks. This interior service bay can be accessible by a user to access and service multiple interior components and parts of the harvester. The interior service play can be shielded from ambient elements by one or more panels 51, 52, 53 of the harvester 1. These panels can be aesthetic body panels of the harvester and can form an exterior surface or shell or housing of the harvester. These panels also or alternatively can be interior panels that are not visible from the exterior of the machine, but that prevent debris and other elements from readily entering the service bay 50. The panels can be constructed from metal, polymers, or other materials. Some of the panels can be configured in the form of a door to provide access to components or the service bay for a user. In other cases, the service bay can be accessible via a floor panel that can be removed so that a user can enter the service bay from the underside of the machine. A variety of different access doors can be fashioned to provide access to the service bay for a user, depending on the application and the machine.

The bin and the various components as described below can be installed in the interior compartment 50 to shield the bin, the motor, the auger, and the granular treatment material inside the bin, and various other components, from ambient elements. As used herein, ambient elements can include rain, snow, moisture, excessive humidity, sleet, hail or other types of moisture or precipitation. By preventing and/or impairing the ability of ambient elements to come in contact with the granular treatment material 100, for example when it is being dispensed from the bin and before it enters the chute 8, the material can be prevented from clumping, sticking or agglomerating to itself and to other surfaces or components within the system 10. In turn, this can impair or prevent the material from becoming clogged in the various components of the system. Accordingly, the system 10 can continue to run with the material being efficiently and consistently transferred to the chute 8 to combine with the harvested forage HF moving through the chute. Optionally, where the granular treatment material is hygroscopic, the positioning of the bin, and the material 100 stored within the bin, inside the interior compartment 50 can prevent and/or impair moisture as well as any other ambient elements from contacting the material to prevent it from clumping, sticking and/or agglomerating.

The bin 20 can be mounted in the interior compartment 50 rearward and/or under the operator cab 4 of the harvester 1. The bin 20 can be mounted rearward of the chute 8 and rearward of the blower 6 of the harvester. The bin 20 can include a cover 20C to prevent debris or other elements from entering the interior 20I of the bin. The cover 20C also can prevent the treatment material 100 from being pulled out of the bin 20 via the suction force SF produced by the vacuum V in the chute 8 that is exerted in the interior compartment 50. The bin 20 can be selectively sized to accommodate a given amount of treatment material 100, which as illustrated, is a granular treatment material in dry and flowable form. As shown in FIG. 2, the bin 20 can include a top 20T which can include an opening through which the treatment material is loaded into the bin. The bin can include walls 20W and optionally slanted walls 20SW below the walls 20W near the bottom 20B. The slanted walls 20SW can convey the material, which can be gravity fed along those walls, toward an auger 30. The bin and walls can be constructed from a suitable material, such as metal, composites, polymers and the like. The bin 20 can be bolted or otherwise fastened to a frame 60 as described below in an upright manner. As shown in FIG. 2, the bin can define an auger opening 22O adjacent the location where the slanted walls 20SW converge. That auger opening can extend through a wall 20W adjacent the bottom 20B.

As shown in FIG. 2, the system can include an auger 30. The auger can be a solid, rigid linear auger as shown having a blade that wraps helically around an axis AA of the auger 30. Optionally, in some cases, the auger 30 can be in the form of a flexible auger that is optionally void of a central support shaft (not shown). Such a flexible auger can be bent or disposed along an arcuate path, yet still can rotate. Optionally, the auger can include a blade in the form of a helical fin that extends repeatedly around an auger central passageway (not shown). The blade can be substantially helical, or can be generally helical, not following a perfect helix, depending on the application. Optionally, although shown as including a continuous blade, the auger 30 can include a blade that is interrupted in some locations but still considered a helical blade. It also will be appreciated that the auger can be replaced with another material mover that is capable of dispensing removing material from the interior 20I of the bin 20. In addition to an auger, such a material mover can be in the form of a conveyor, a pusher, a scoop, a dumper, a chain, a vibrating plate, or any other type of element capable of moving the granular treatment material relative to the bin and its components.

As mentioned above, the granular treatment material 100 can be fed toward the auger 30 under the force of gravity. In so doing, the material can slide down and/or along the sidewalls 20W, as well as along the slanted walls 20SW toward the auger. The auger can be rotated via a motor 38. The motor 38 can be powered by a battery or other power source on board the harvester 1. The motor can supply the rotational force and torque to rotate the auger 30 to convey the material 100 in the bin 20 toward the opening 20O. The motor 38 can be electrically coupled to a controller of the system 10, which can be mounted in the operator cab 4 of the harvester 1, in plain view of the operator O. The motor can rotate the flexible auger at one or more RPMs, depending on the feed rate of the material from the bin to the chute to treat the harvested forage HF in the chute.

As illustrated in FIG. 2, the auger 30 can extend within or near the bottom of the bin, through the opening 22O and into a dispensing tube 40 a preselected distance. As shown, the auger 30 can extend along the auger axis AA in the bin 20, generally at or near the bottoms of the sidewalls 20SW. The auger can extend a distance D1, which can be optionally at least 2 inches, at least 3 inches, at least 4 inches, at least 5 inches, at least 6 inches, at least 1 foot, at least 2 feet or at least 3 feet, into the dispensing tube 40.

The dispensing tube 40, it can extend from the opening 20O of the bin adjacent and/or away from the chute 8 within which the forage material HF is conveyed, optionally under a vacuum V. The tube 40 can include a first or proximal end 41 that is adjacent and/or joined with the bin. The tube can include a second or distal end 42. Optionally, the distal end 42 of the tube 40 can include a drop tube or pipe 44 and/or a vent 45. The vent 45 and the drop pipe 44 can be joined with or included in the dispensing tube 40 in a T configuration as shown, or some other configuration. The drop pipe 44 can extend downward or laterally or transversely from the distal end 42 and can include an ejection or tube opening 44O, which can be disposed below or under the auger axis AA, and optionally below the bin 20. The opening 44O can extend or face toward a catch tube 70 as described below, with the material conveyed in the tube thus ejected out the opening 44O and eventually entering the chute or some other part of the machine, to mix with the harvested forage HF. That forage can be drawn by the vacuum V.

Figure 6:
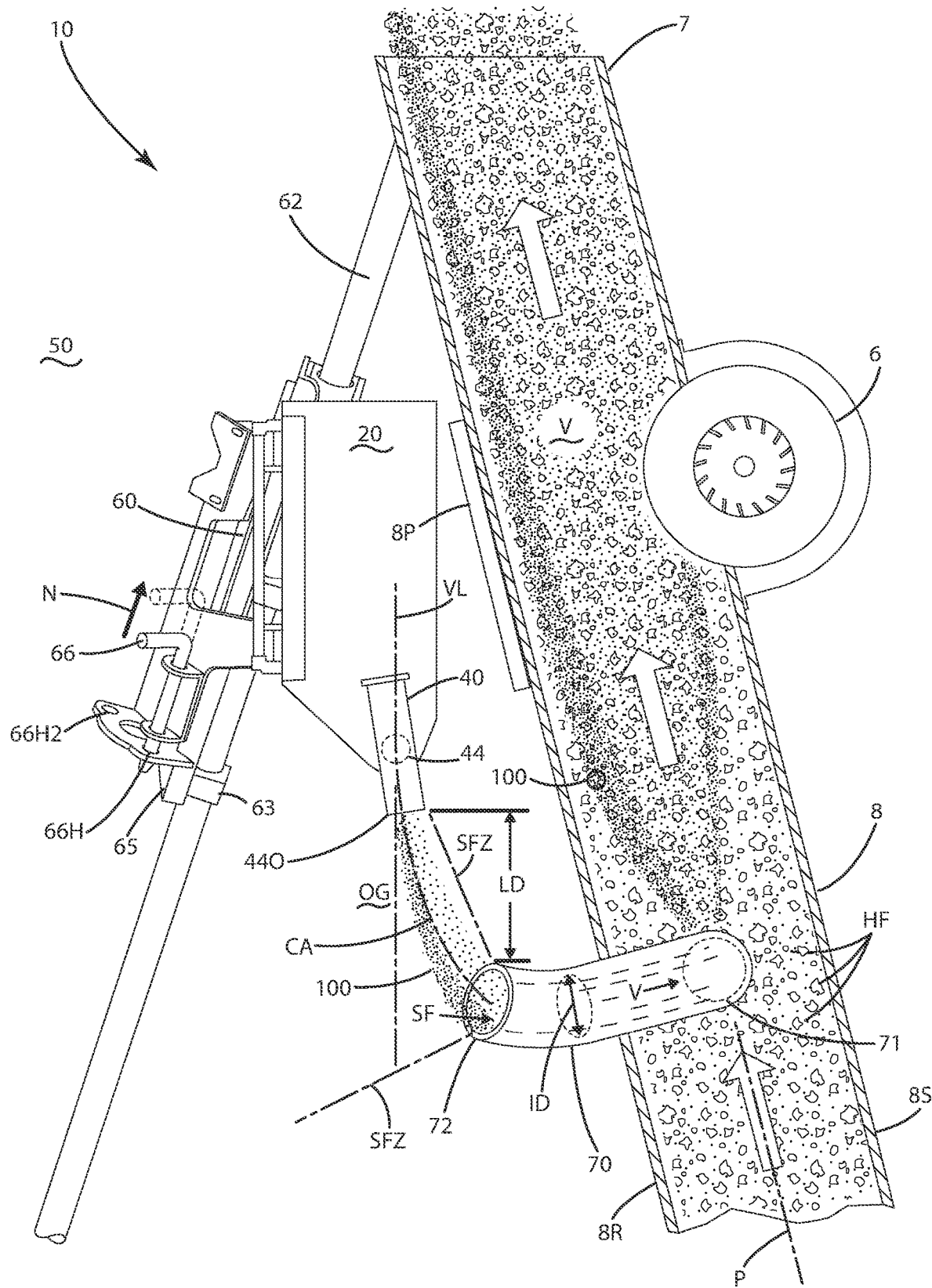
FIG. 6 is a side view of the system with a vacuum exerting a suction force from a chute, through a catch tube, and on treatment material dispensed from the bin into an open gap to pull the material under the suction force into the catch tube so that the material can mix with harvested forage material moving inside the chute.

As shown in FIGS. 2 and 6, the vent 45 can extends upward and includes another or second opening 45O, which is distal from the tube opening 44O. This second opening 45O can provide venting for the tube and contents such as the material as the material is conveyed to the tube opening 44O. The vent can allow air to enter the tube and/or drop tube so that air can be drawn into the tube and the material does not become clogged in the tube 40 and/or drop tube 44. The second opening 45O optionally can be disposed above the auger axis AA. That opening 45O also can be disposed above the ejection opening 44O as well, and generally outside the chute 8. Although not shown, the vent 45 can be curved downward, with the opening 45O facing generally downward. As shown, the vent opening 45O is oriented so that it distal from and faces upward, away from the catch tube 70 and its catch opening 70O.

Figure 7:
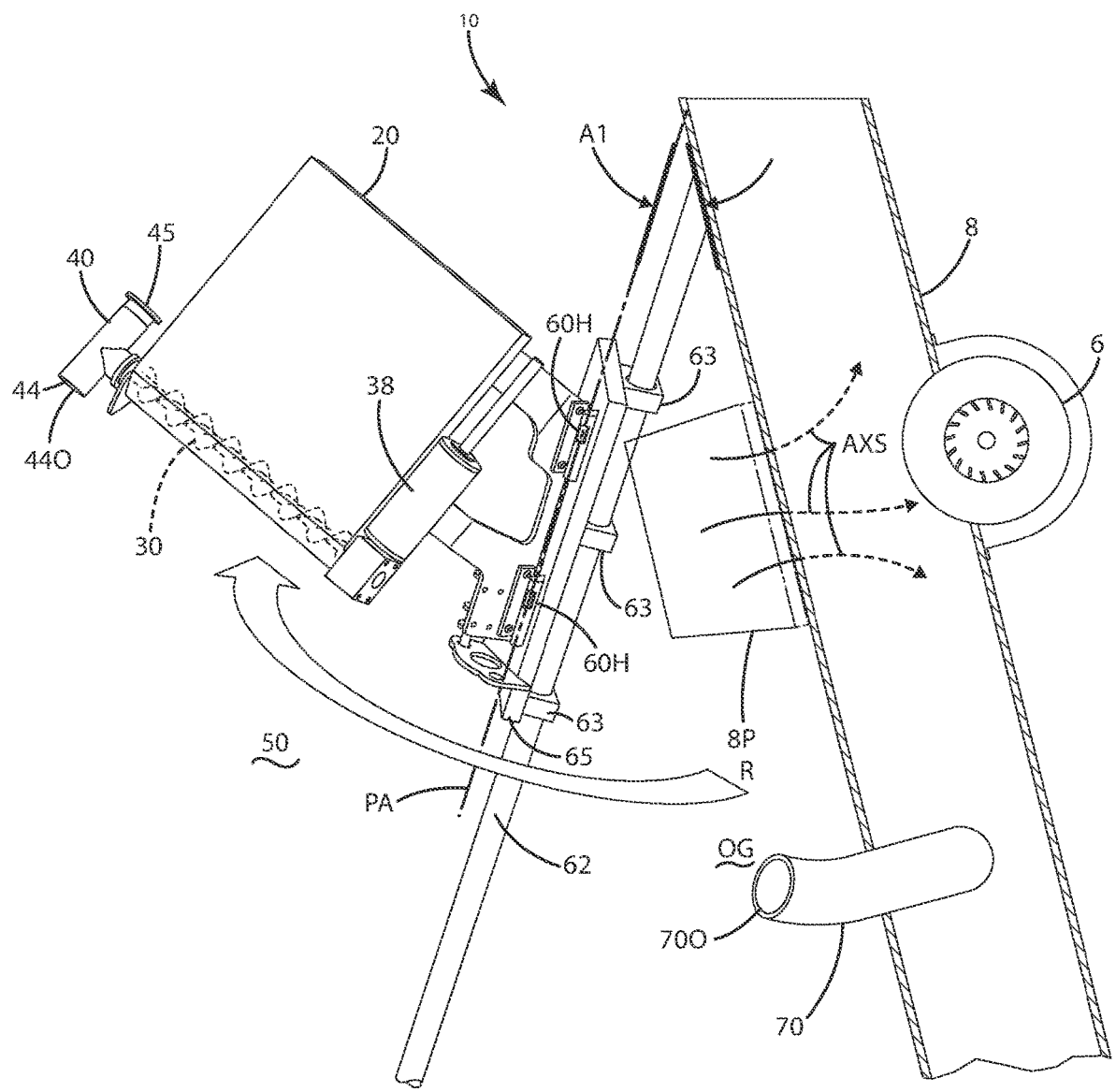
FIG. 7 is a side view of the system with the bin in an access mode and an access panel opened to access the chute and a blower.

The bin 20 that stores the material 100 can be movable within the interior compartment 50. As shown in FIGS. 2-7, the bin 20, the motor 38, the auger 30 and the dispensing tube and its components 40 can be mounted to a frame 60. This frame 60 can extend and can be joined with a support bar 62. This bar 62 can be disposed in an angle A1 relative to the chute 8 as shown in FIG. 7. This angle A1 can be an acute angle, optionally between 0° and 90°, between 10° and 60°, inclusive, or between 20° and 45°, inclusive. The precise angle A1 can be selected depending on the relative orientation and disposition of the chute 8, and the associated orientation of the bin 20 relative to the chute to provide adequate dispensation of the treatment material into the catch tube 70 and chute 8.

The frame 60 can include sleeves or brackets 63 that attach to the bar 62 so that the frame 60 and the attached bin 20 can rotate about a pivot axis PA. This pivot axis can correspond to the axes of rotation of the hinge 60H, or to a longitudinal axis of the bar 62. The brackets or sleeves can include one or more bushings or bearings (not shown) to facilitate rotation of the bin 20. The frame 60 can be removably secured to the sleeve 63 so that the frame 60, bin 20 and/or motor 38 can be removed from the bar 62 and from the interior service bay and/or repair. The sleeve and thus the frame 60 can be held in a predetermined location along the bar 62 via one or more collars 65 that can be fixed and immovable relative to the bar 62. Optionally, in other applications, the frame can include a hinge 60H that simply secures the bin to the bar 62 or some other panel or component inside the interior compartment 50. Further optionally, the hinge 60H can be a complex hinge, structured as a parallelogram hinge, an articulated hinge, telescoping hinge or some other complex hinge capable of providing a combination of linear, lateral or rotational movement to move the bin, for example, from the application mode to the access mode and vice versa. In some cases, the bin can be moveable from one position to another for simple loading operations, servicing, repair or other adjustment of the bin and system, rather than to provide access to a panel or application of the material. In such cases, when the bin moves from one location to another, it can still be considered to be moving between modes.

With reference to FIGS. 6-7, the frame 60 can include a lock or latch 66. This lock can be selectively engaged with a portion of the collar 65 or other component inside the bay. The lock 66 can be engaged and disengaged from the collar 65 so that the bin 20 can be moved and converted from an application mode as shown in FIG. 6, to an access mode, shown in FIG. 7. The lock 66 can engage a hole 66H in the collar 65 to secure the frame 60 and the bin 20 in the application mode so that the drop pipe 44 and the tube 40 is placed a predetermined linear distance LD relative to the catch tube 70 as described below. The lock can be moved in direction N shown in FIG. 6 so as to remove the portion of the lock from the hole 66H so that the frame 60 and the bin 20 are free to rotate about the pivot axis PA and/or the bar 62. In particular, with the lock 66 unhooked, the bin 20 and connected components can be rotated in direction R, as shown in FIG. 7 to the access mode shown there. Optionally, the frame and/or collar 65 can include a second hole 66H2. The lock 66 can be released to engage the second hole 66H2, to subsequently hold or lock the bin in the position shown in FIG. 7, in which the bin is in the access mode. In this configuration, a user can access the access panel 8P while the bin is secured in a position, without having to hold onto the bin.

Optionally, the bin and associated components can be movable to provide access to certain components of the harvester in the interior compartment. For example, as shown in FIGS. 3-6, the chute 8 can be associated with a blower 6 that provides the vacuum V inside the chute 8 to move the harvested forage material HF through the harvester 1. The blower and the chute can be accessed via access panel 8P. This access panel 8P can be movably associated with the chute 8. In some cases, the access panel 8P can be a sliding panel or a hinged panel that rotates relative to the chute 8. When the access panel is opened, as shown in FIG. 7, a user can access various components including the interior of the chute 8, the blower 6 or other elements along the lines of access AXS.

Figure 4:
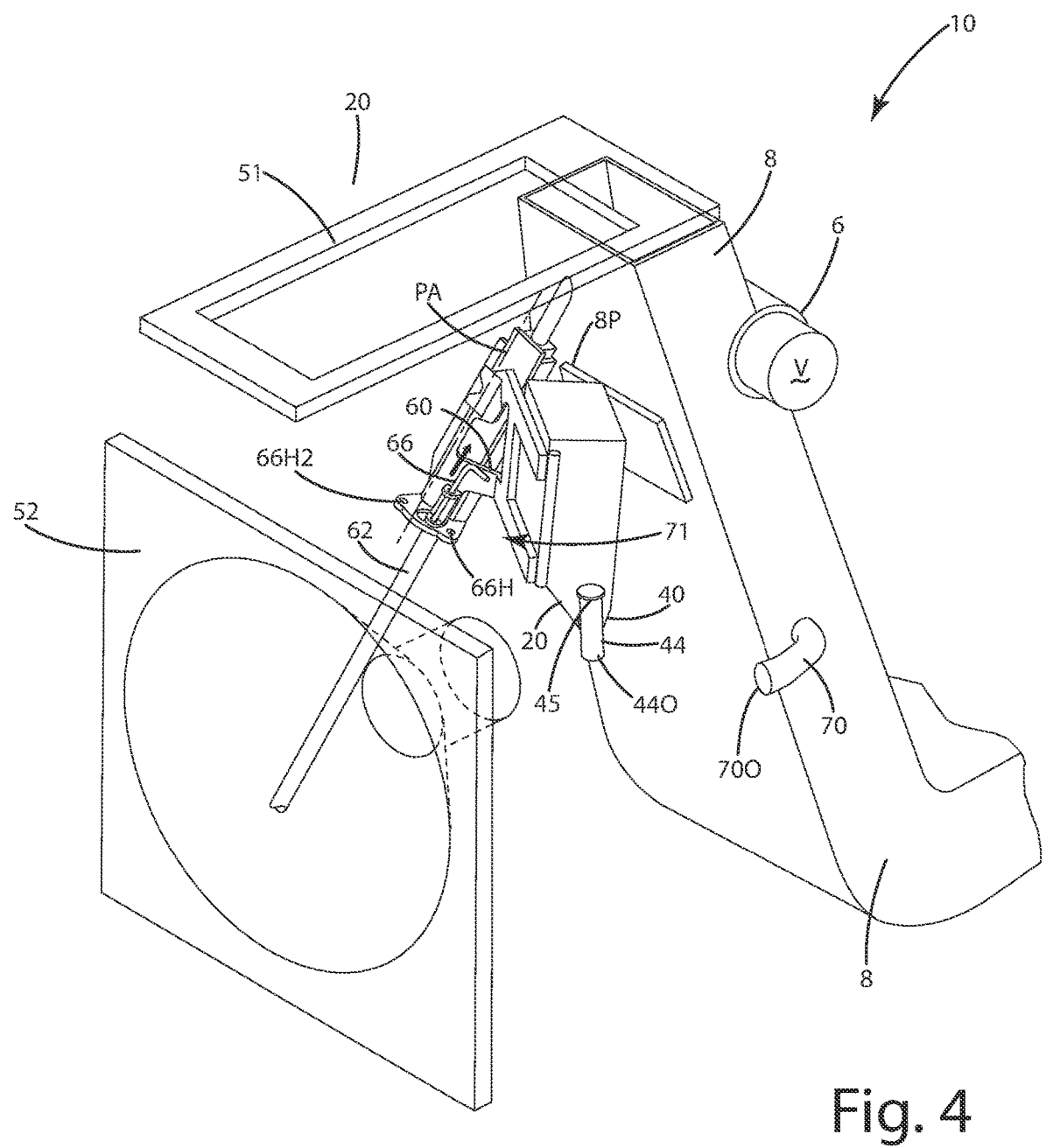
FIG. 4 is another break away view of the applicator system with the bin located inside the service bay, and the bin moving on a frame to transition from the application mode to an access mode.
Figure 5:
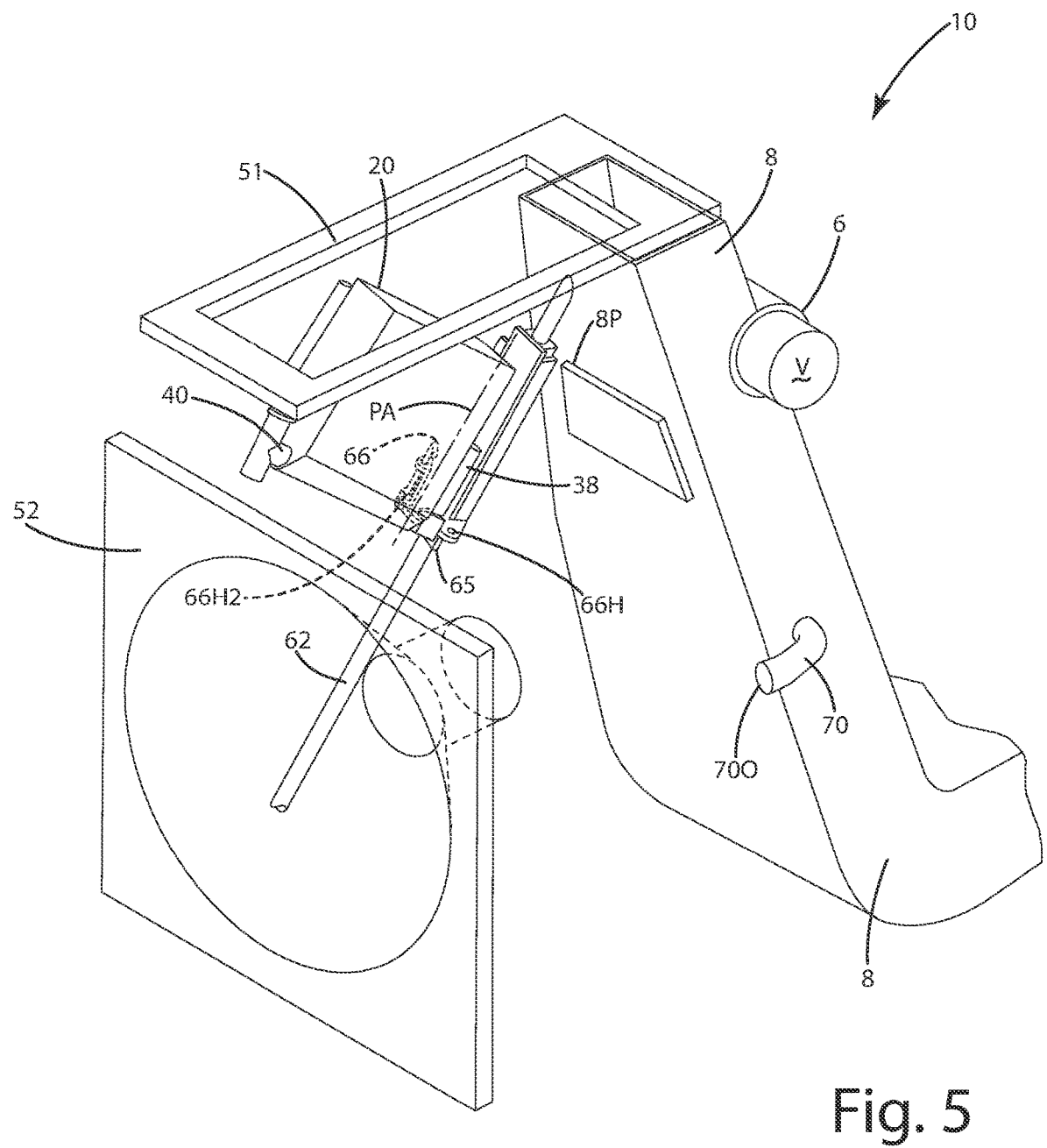
FIG. 5 is another break away view of the applicator system with the bin located inside the service bay, and the bin in the access mode so that the access panel is no longer obstructed by the bin and can be accessed by a user.

As shown in FIGS. 2-7, the bin 20 and its components can be placed immediately adjacent the chute 8 so that the treatment material 100 can be dispensed from the bin and into the catch tube 70 that is associated with the chute 8. Due to this proximity of the bin and its components relative to the chute 8, however the bin can block and prevent access to the access panel 8P as shown in FIGS. 3 and 6. There, the bin is in an application mode. The access panel 8P is effectively obstructed by the bin when in this mode. When a user desires to enter the service bay or interior compartment 50 and utilize the access panel 8P, the user can do so by transitioning the bin from the application mode to an access mode. To do so, as shown in FIG. 3, the user can move the lock 66 to disengage it from the hole 66H. As a result, the cantilevered frame 60 and bin 20 associated with it can be rotated in direction R1. As it is so rotated, the bin and frame 60 rotate about the pivot axis PA and optionally relative to the bar 62 where a sleeve is included. The frame 60 and bin 20 can continue to be rotated in direction R1 as shown in FIG. 4 to begin to access the access panel AP. The rotation R1 can continue until, as shown in FIG. 5, the access panel 8P is fully exposed. Optionally, the user can engage the lock 66 again or allow the lock 66 to engage the second hole 66H2 to hold the bin and the frame and the orientation as shown in FIGS. 5 and 7. In this orientation, the bin 20 is held satisfactorily out of the way of the access panel so the access panel 8P is no longer obstructed by the bin 20 in the access mode. A user can then rotate, slide or otherwise move the access panel AP to gain access to the blower 6, the chute 8 or other elements beyond the access panel AP along the access lines AXS. After the user has completed the access of the relevant components, the user can reverse the above operations to close the access panel 8P and return the bin 20 and its components to the application mode.

Optionally, due to the rigid and secure attachment of the bin to the frame and the bar 62 or some other element, when the bin and its components are returned to the application mode, the dispensing tube 40 and the drop tube 44 as well as the tube opening 44O can return to a precise orientation and linear distance LD from the catch tube 70 and its catch opening 70O. As shown, the bin 20 and the associated components, such as the dispensing tube 40 and the motor 38, can be secured to the bar 62 or some other component in the interior compartment 50 in a swinging and cantilevered manner. The bin 20 frame 60, as well as all the material 100 inside the bin, can be entirely supported by the frame on the bar 62. In some cases, there is no other connection to the bin distal from the bar 62. Thus, the bin can project outwardly from the bar, mounted to the frame 60, in a cantilevered manner. Further optionally, the frame and/or bin can be supported at multiple locations, on opposing sides or upper and lower portions of those elements. Yet further optionally, the frame, bin and other parts of the system 10 can be joined to a frame of the forage harvester, a panel or of the forage harvester, or some other structure inside the service bay or elsewhere on the forage harvester.

As mentioned above, the system can include a catch tube 70 including a catch opening 70O. This catch tube 70 and its configuration within the system 10 can be understood with reference to FIG. 6. There, the bin 20 is in an application mode. The catch tube 70 can include a first end 71 that is adjacent an interior of the chute 8, and a second end 72 that is distal from the first end and defining the catch opening 70O. The first end can be in direct fluid communication with the interior of the chute 8. Indeed, the first end can open into the interior of the chute. The catch tube 70 as shown can be of a curved, cylindrical configuration and can extend rearward from the chute 8 to a location generally under or below the bin 20, and in particular the dispensing tube 40 and any associated drop tube 44. Of course, in other configurations, the catch tube can be a linear straight tube.

The catch tube 70 can be joined with a panel of the chute 8, for example a side panel 8S or rear panel 8R of the chute 8. The catch tube first end 71 can be welded, fastened or otherwise secured to the panel of the chute. The catch tube 70 can extend from the panel in a cantilevered configuration. In this configuration, catch tube can be supported substantially by its attachment of the first end 71 to the chute 8. The catch tube can project outward and away from the chute. The catch tube can extend optionally a distance of less than 4 feet, less than 3 feet, less than 2 feet or less than 1 foot before terminating at the second end 72 and the associated catch opening 70O. Other distances can be selected, however, the distance can be sufficient so that the vacuum V can be drawn through the catch tube 70 to produce a suction force zone SFZ within the interior compartment 50 of sufficient force to pull the dispensed granular material 100 into the catch tube 70 as the material falls within the interior compartment or generally relative to the dispensing tube 40.

The catch tube 70 optionally can include an inner diameter ID that is sufficient to allow the vacuum V to exert a suction force SF to pull the granular treatment material 100 through the catch tube without the material accumulating in the catch tube, for example, without the material stacking, piling up, agglomerating, accumulating or backing up inside that tube. In some cases, the particles of the material 100 can simply transition and fly through the catch tube from the second end to the first end and then into the interior of the chute where they are mixed with the harvested forage material HF. The inner diameter ID can be optionally greater than 2 inches, greater than 3 inches, greater than 4 inches, greater than 5 inches, greater than 6 inches, between 2 inches and 8 inches, inclusive, between 3 inches and 6 inches inclusive, or between 3 inches and 5 inches, inclusive. The catch opening 70O can have a similar dimension or diameter to those mentioned above. Of course, the catch tube in some cases can be polygonal so that its interior dimension is not a diameter, in which case, the interior dimension can be equal to the above inner diameters.

As shown in FIG. 6, the catch tube 70 can terminate at catch opening 70O. This catch opening can be linearly distanced from the tube opening 44 which can be located at an end of the dispensing tube 40 or the drop pipe 44. The linear distance LD can be optionally at least 3 inches, at least 4 inches, at least 5 inches, at least 6 inches, at least 1 foot, at least 2 feet, between 6 inches and 2 feet, inclusive, between 6 inches and 1 foot, inclusive or other dimensions depending on the suction force SF exerted by the vacuum V in the chute and/or in the catch tube 70. The linear distance LD also can be sufficient so that the tube opening 40O is not disposed inside the catch opening 70O, that is, the openings are a distance far enough away from one another that the openings do not overlap another, with one tube or portion of a tube inside the other.

With the catch opening 70O distal from the tube opening 44O, an open gap OG is formed between these openings, and the catch tube and dispensing tube in general. As shown in FIG. 6, the granular treatment material 100 dispensed from the dispensing tube 40 and the opening 40O can be drawn across the open gap OG and into the catch opening with a suction force SF of the vacuum V so the granular treatment material is pulled into the chute to mix with the harvested forge HF moving along the pathway P in the chute. The catch opening 70O of the catch tube 70 can be separated from the tube opening a predetermined distance such that a suction force SF of the vacuum V is exerted on the granular treatment material as it exits the tube opening 44O and pulls the granular treatment material 100 toward the catch opening while the granular treatment material is airborne while moving in the open gap OG. For example, as individual particles of the granular treatment material begin to fall under the force of gravity from the opening 40O of the dispensing tube 40, those particles are within a suction force zone SFZ that is exerted by the vacuum drawn in the chute and the catch tube. In that suction force zone SFZ, a suction force SF is exerted within the interior compartment 50. Due to the opening 44O being above, adjacent, and/or within that suction force zone SFZ, the falling particles are pulled via the suction force toward the catch opening 70O so that they can enter that catch opening, and can be further pulled via the vacuum V through the catch tube 70 and into the chute 8 where they and the material mixes with the harvested forge HF.

In some cases, the granular treatment material falls under the force of gravity initially parallel to or along a vertical line VL as shown in FIG. 6. The material can fall out of the tube opening 40O, however, as it does, it enters the suction force zone SFZ. In so doing, the suction force SF is exerted on the material such that the material is moved along a trajectory toward the catch opening 70O. The granular treatment material under the suction force SF pulls that material toward the catch opening as the material falls in the air. Thus, the force of gravity as well as the suction force can cooperatively act simultaneously on the granular treatment material in the open gap OG. As this occurs, the trajectory of the material 100 and its individual particles can move along an arched trajectory that curves along a curved axis CA toward the catch opening 70O. In some cases, the material and the individual particles thereof are pulled off course from a vertical fall trajectory parallel to the vertical line VL, to the curved or arched trajectory, again that curves or arches toward the catch opening 70O and the catch pipe 70. Optionally, some particles of the treatment material can fall along a trajectory that includes a substantially vertical component and an arched or curved component. Along the vertical component, the particles can fall under the force of gravity, but upon entering the suction force zone SFZ, the particles can be pulled with the suction force SF, while also still falling under the force of gravity, so that the particles move along the arched trajectory along or aligned with the curved axis CA. Optionally, the suction force SF also can be exerted on material in the drop pipe 44 and/or in portion of the tube 40 itself. Accordingly, the vacuum can draw some of the material into the chute from that location, with the material never falling along a vertical path from the opening.

As mentioned above, the catch opening 70O can be separated from the tube opening 40O by linear distance LD. This linear distance LD can be sufficient to provide access to the catch opening 70O by a user through the open gap OG. The catch opening also can be sufficiently sized to enable a tool to extend from the open gap OG into the catch tube to remove granular treatment material from an interior surface of the catch tube 70 while the catch tube remains joined with the chute 8. For example, the catch opening can be sufficiently large so that a user can insert a scraper, screwdriver, dowel, stick or other tool into the interior of the catch tube 70 through the catch opening 70O. The user can plunge, scrape and/or remove any agglomerated or clumped treatment material on the inside surfaces of the catch tube 70, removing it either into the service area 50 or pushing it through the catch tube 70 to the chute 8. To gain access to the opening 70O, the user need not move the bin or any other components inside the service bay because the open gap OG is large enough sufficient enough for user to insert the tool and any associated handle into the catch tube 70, and perform the activity of inspecting the catch tube and optionally removing any clumped or agglomerated treatment material therein.

A method of using the applicator system 10 of the current embodiment to deliver a granular treatment material to forage during harvesting will now be described. The method can generally include: harvesting forage HF from a field with a forage harvester 1 as the harvester moves; providing a vacuum V and conveying harvested forage through a chute 8 and along a pathway P with the vacuum, the chute 8 joined with a catch tube 70 having a first end 71 in communication with an interior of the chute, and a second end 72 distal from the first end and defining catch opening 70O; providing a bin 20 mounted in a compartment 50 inside the mobile forage harvester 1; providing a tube 40, 44 extending away from the bin toward the catch tube 70, the tube including a tube opening 44O separated from the catch opening by an open gap OG; moving a granular treatment material 100 so that the granular treatment material moves out of the tube 40 into the open gap OG; and drawing the moving granular material across the open gap OG and into the catch opening 70O with the vacuum so that the granular treatment material mixes with the harvested forage HF moving along the pathway P in the chute 8.

More particularly, with reference to FIG. 1, a motorized forage harvester 1 can propel itself under its own power along the ground G of a field having a stand of forage F. As the harvester moves, it harvests the forage F with the chopper head 5. Harvested forage HF is drawn into and through the chute 8. A vacuum V is provided via a vacuum source, which optionally can be a blower or fan 6 rotated by a motor 3 that optionally propels the body 2 and the harvester in general along the ground G. The vacuum V in the chute, optionally generated by the fan or some other vacuum source, draws the harvested material HF through the machine until it is passed through an ejector chute 7. Harvested material HF is ejected from the ejector chute along a trajectory into a container T that is distal from the harvester 1. The container T can be in the form of a trailer towed by a truck T1 in the field.

The treatment material 100 can be pulled and introduced into, or otherwise mixed in and/or with the harvested material and dispersed throughout it as the material and the forage continue to flow and tumble and intermix through the remainder of the machine. By the time the harvested forge material reaches the ejector chute 7 and is ejected out of the chute into another container T, the treatment material 100 is adequately mixed with and through the forage HF to provide desired effect of treatment of the harvested forage.

The system 10 can be in full operation during the harvest activity, as the harvester moves and harvests the forage F. The bin 20 contains a supply of treatment material 100 such as those described herein. The treatment material 100 is fed by gravity, traveling downward toward the bottom, optionally funneled by the slanted walls 20SW toward the auger 30. Power is provided by a power source on board the harvester 1 to the motor 38 of the system. The motor rotates the helical auger 30 in the bottom of the bin to engage the material. The auger or some other material mover can move the granular treatment material into the dispensing tube 40 and out the tube opening 44O, which optionally can be at the bottom of a drop pipe 44. Air can feed into the top of the vent to facilitate movement out of the opening 44O.

With reference to FIG. 5, the vacuum source 6, which can be a blower, fan or other source of vacuum, produces a vacuum V within the chute 8. This vacuum V pulls the harvested forage HF along the pathway P through the chute 8. This vacuum force V also exerts a vacuum force V in the catch tube 70. This vacuum V further produces a suction force SF that emanates within the suction force zone SFZ surrounding the catch opening 70O, and can be exerted throughout a substantial portion of the interior compartment 50 of the machine 1. As mentioned above, the catch tube opening 70O can be positioned a linear distance LD from the tube opening 44O, which again can be an opening to the drop tube 44 or the tube 40. Between the catch tube opening 70O and the tube opening 44O is the open gap OG. Optionally, the suction force zone SFZ exerts the suction force SF strongly within the open gap OG.

As also mentioned above, the bin 20 is outfitted with material mover, such as an auger 30. As the auger rotates, it moves the granular treatment material 100 through the tube 40 and out the tube opening 44O. As the individual particles of the granular treatment material 100 fall from the opening 44O, they are subject to the suction force SF within the suction force zone SFZz. Under conditions where the suction force of the vacuum is not exerted, these particles would typically fall vertically, generally parallel to the vertical line VL, under the force of gravity downward. However, with the suction force SF produced by the vacuum V within the suction force zone SFZ, when the particles fall, at some point they begin to be pulled by the suction force SF toward the catch opening 70O. The particles can begin to be pulled off of a vertical trajectory under the force of gravity to a curved or arched trajectory, for example, along the curved axis CA immediately after leaving the tube opening 44O. In some cases, the particles can fall less than 1 inch, less than 2 inches, less than 3 inches, less than 4 inches less than 5 inches and then under the force of gravity, and then begin to change course along an arched trajectory generally following a curved axis CA toward the catch opening 70O.

Optionally, the suction force SF can be strong enough so that it begins to pull the particles of the granular treatment material before they even exit the tube opening 44O. The linear distance LD of the catch opening 70O can be selected so that the suction force within the suction force zone SFZ pulled by the vacuum V is not strong enough to pull the treatment material out from the bin without the conveyance or movement by the auger or other material mover. Further, the linear distance LD can be selected so that suction force SF does not pull material out from the vent tube 45 or from the top of the bin 20 of the system.

As the particles of the granular treatment material fall, through the air, and through the interior compartment 50, they are acted on by both a force of gravity pulling them vertically downward, as well as a cooperative suction force SF within the suction force zone SFZ created by the vacuum V though the chute. With these two different forces acting on the granular treatment material simultaneously, the particles can move along an arched trajectory having a curved path or curved axis that is along, aligned with or parallel to the curved axis CA until those particles enter the catch opening 70O.

When the granular treatment material enters the opening 70O, it can be further pulled by the suction force SF produced by the vacuum V toward the chute 8 through the catch tube 70. As the individual particles enter the catch tube 70, many remain airborne and proceed along a trajectory within the catch tube 70 without stacking, piling or accumulating within the catch tube 71. Of course, some particles may collide with the interior surfaces and walls of the catch tube 70. In cases of extreme moisture, such as high humidity, some of the particles can agglomerate on the interior of the catch tube 70. However, due to the continuous high velocity of the of the incoming particles of treatment material, the clumping and accumulation can be minimized and sometimes broken up. Optionally, the particles move through the catch tube primarily under the suction force SF exerted by the vacuum V, rather than under the force of gravity. In some cases, the particles of the treatment material, and the treatment material in general, can move through the catch tube 70 at a velocity of optionally at least 10 miles per hour, at least 20 miles per hour, at least 30 miles per hour, at least 40 mph, at least 50 mph or more from the second end 72 to the first end 71. While doing so, most the majority of particles of the treatment material can remain airborne in the catch tube without stacking, piling up upon one another, accumulating and/or agglomerating under the force of gravity within the lower portion of the catch tube 70.

After the particles traverse the catch tube 70 from the second end 72 to the first end 71, the particles can be immediately launched into and can enter the chute 8. As the treatment material 100 enters the chute, it can remain under suction force of the vacuum V, along with the harvested forage HF. As the harvested forage HF continues through the machine, through the chute 8, and out the ejector chute 7, the treatment material and harvested forge can thoroughly mix with one another so that the treatment material is dispersed within the harvested forage HF by the time it is shot along a trajectory and/or dumped into the container T.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

In addition, when a component, part or layer is referred to as being "joined with," "on," "engaged with," "adhered to," "secured to," or "coupled to" another component, part or layer, it may be directly joined with, on, engaged with, adhered to, secured to, or coupled to the other component, part or layer, or any number of intervening components, parts or layers may be present. In contrast, when an element is referred to as being "directly joined with," "directly on," "directly engaged with," "directly adhered to," "directly secured to" or "directly coupled to" another element or layer, there may be no intervening elements or layers present. Other words used to describe the relationship between components, layers and parts should be interpreted in a like manner, such as "adjacent" versus "directly adjacent" and similar words. As used herein, the term "and/or" includes any and all combinations of one or more of the associated listed items.

The above description is that of current embodiments of the invention. Various alterations and changes can be made without departing from the spirit and broader aspects of the invention as defined in the appended claims, which are to be interpreted in accordance with the principles of patent law, including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, any combination of X, Y and Z, for example, X, Y, Z; X, Y; X, Z; Y, Z, and/or any other possible combination together or alone of those elements, noting that the same is open ended and can include other elements.

What is claimed is:

1. An agricultural forage treatment applicator system that delivers a granular treatment material to forage during harvesting, the system comprising:
    a mobile forage harvester defining an interior compartment, the mobile forage harvester configured to move across a field to harvest forage;
    a chute extending adjacent the interior compartment;
    a vacuum source in fluid communication with the chute, the vacuum source producing a vacuum that conveys harvested forage through the chute and along a pathway with the vacuum, the chute joined with a catch tube having a first end in fluid communication with an interior of the chute, and a second end distal from the first end and defining a catch opening;
    a bin mounted in the interior compartment inside the mobile forage harvester, the bin being located adjacent the chute, the bin configured to store a supply of a granular treatment material;
    a tube extending from the bin toward the catch tube, the tube including a tube opening distanced from the catch opening by an open gap of at least 3 inches; and
    an auger rotatably mounted in the bin to convey the granular treatment material so that the granular treatment material moves out of the tube into the open gap, wherein the granular treatment material is drawn across the open gap and into the catch opening with the vacuum so that the granular treatment material mixes with the harvested forage moving along the pathway in the chute.

2. The system of claim 1,
wherein the granular treatment material falls under the force of gravity out the tube opening and is moved along a trajectory toward the catch opening with the vacuum exerting a suction force directly on the granular treatment material, pulling the granular treatment material toward the catch opening as the granular treatment material falls,
wherein the catch opening is disposed a linear distance from the tube opening.

3. The system of claim 2,
wherein the trajectory is an arched trajectory that curves toward the catch opening.

4. The system of claim 1,
wherein the interior compartment is a service bay disposed between forward and aft wheels or tracks of the mobile forage harvester,
wherein the mobile forage harvester includes an operator cab configured to accommodate an operator during operation of the mobile forage harvester.

5. The system of claim 1,
wherein the bin is pivotable about a pivot axis.

6. The system of claim 5,
wherein the chute includes an access panel configured to allow a user to gain access to at least one of the chute and a blower associated with the chute,
wherein the access panel is obstructed by the bin when the bin is in an application mode,
wherein the access panel is not obstructed by the bin when the bin is in an access mode,
wherein the bin pivots about the pivot axis transitioning from the application mode to the access mode.

7. The system of claim 1,
wherein the tube extending from the bin includes a drop pipe and a vent,
wherein the drop pipe defines a drop pipe opening that faces toward the catch opening,
wherein the vent includes a vent opening that is distal from the drop pipe opening.

8. The system of claim 1,
wherein the catch tube is joined with a panel of the chute,
wherein the catch tube extends from the panel in a cantilevered configuration a distance of less than 3 feet before terminating at the catch opening,
wherein the catch opening of the catch tube is separated from the tube opening a distance such that a suction force of the vacuum is exerted on the granular treatment material as the granular treatment material exits the tube opening to pull the granular treatment material toward the catch opening while the granular treatment material is airborne while moving in the open gap.

9. The system of claim 1,
wherein the catch opening is sized to enable a tool to extend from the open gap into the catch tube to remove granular treatment material from an interior surface of the catch tube while the catch tube remains joined with the chute.

10. The system of claim 1 comprising:
an access panel disposed in the interior compartment adjacent the bin,
wherein the bin is selectively moveable relative to the access panel so as to enable a user to access the access panel.

11. An agricultural forage treatment applicator system that delivers a granular treatment material to forage during harvesting, the system comprising:
a mobile forage harvester including a chute, the mobile forage harvester configured to move across a field to harvest forage;
a vacuum source in fluid communication with the chute, the vacuum source producing a vacuum that conveys harvested forage through the chute and along a pathway with the vacuum, the chute joined with a catch tube having a catch opening;
a bin mounted to the mobile forage harvester, the bin configured to store a supply of a granular treatment material;
a dispensing tube extending from the bin toward the catch tube, the dispensing tube including a tube opening separated from the catch opening by an open gap; and
a material mover mounted relative to the bin and configured to convey the granular treatment material out of the dispensing tube into the open gap,
wherein the granular treatment material is drawn across the open gap and into the catch opening by the vacuum exerting a suction force directly on the granular treatment material to pull the granular treatment material into the catch opening as the granular treatment material falls, and so that the granular treatment material subsequently mixes with the harvested forage moving along the pathway in the chute.

12. The system of claim 11,
wherein the mobile forage harvester includes an interior service bay shielded from ambient elements by a plurality of panels,
wherein the bin is disposed in the interior service bay,
wherein the bin is located adjacent the chute.

13. The system of claim 12,
wherein the tube opening is disposed a linear distance of at least 3 inches from the catch opening across the open gap.

14. The system of claim 13,
wherein the catch opening is sized to enable a tool to extend from the open gap into the catch tube to remove granular treatment material from an interior surface of the catch tube while the catch tube remains joined with the chute and while the dispensing tube remains attached to the bin.

15. The system of claim 11 comprising:
an access panel disposed in the interior compartment adjacent the bin,
wherein the bin is selectively moveable relative to the access panel so as to enable a user to access the access panel.

16. The system of claim 11,
wherein the material mover is a rotatable auger disposed in a bottom of the bin,
wherein the auger is configured to rotate and auger the granular treatment material to the tube extending from the bin; and
wherein a motor is joined with the auger and configured to rotate the auger at one or more RPMs.

17. A method of using an agricultural forage treatment applicator system to deliver a granular treatment material to forage during harvesting, the method comprising:
harvesting forage from a field with a mobile forage harvester as the mobile forage harvester moves in the field;
providing a vacuum and conveying harvested forage through a chute and along a pathway with the vacuum, the mobile forage harvester having an operator cab configured to accommodate an operator, the chute joined with a catch tube having a first end in fluid communication with an interior of the chute, and a second end distal from the first end and defining catch opening;

providing a bin mounted in an interior compartment inside the mobile forage harvester;

providing a tube extending away from the bin toward the catch tube, the tube including a tube opening separated from the catch opening by an open gap;

moving a granular treatment material so that the granular treatment material moves out of the tube into the open gap; and drawing the moving granular treatment material across the open gap and into the catch opening with the vacuum exerting a suction force on the granular treatment material as the granular treatment material moves within the open gap between the catch opening and the tube opening so that the granular treatment material mixes with the harvested forage moving along the pathway in the chute.

18. The method of claim 17, wherein the catch opening is upwardly oriented, wherein the tube opening is downwardly oriented, wherein the granular treatment material falls under the force of gravity out the tube opening and as the granular treatment material is falling through air, the granular treatment material simultaneously is pulled via a suction force of the vacuum along a trajectory toward the catch opening.

19. The method of claim 18, wherein the trajectory is an arched trajectory that curves toward the catch opening.

20. The method of claim 17, wherein the granular treatment material falls through air along a trajectory that is dictated by a suction force that is exerted directly on the falling granular treatment material by the vacuum.

* * * * *